United States Patent
Chunodkar et al.

(10) Patent No.: US 9,725,093 B2
(45) Date of Patent: Aug. 8, 2017

(54) VEHICLE CONTROLS INCLUDING DYNAMIC VEHICLE MASS AND ROAD GRADE ESTIMATION DURING VEHICLE OPERATION

(71) Applicant: Cummins Inc., Columbus, IN (US)

(72) Inventors: Apurva Chunodkar, Greenwood, IN (US); Timothy Proctor, Columbus, IN (US); Vivek Anand Sujan, Greenwood, IN (US); Kenneth Follen, Columbus, IN (US); Gary Salemme, Columbus, IN (US); Phani Vajapeyazula, Columbus, IN (US); An Wu, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/840,861

(22) Filed: Aug. 31, 2015

(65) Prior Publication Data

US 2016/0082964 A1  Mar. 24, 2016

Related U.S. Application Data

(60) Provisional application No. 62/054,050, filed on Sep. 23, 2014.

(51) Int. Cl.
 *G06F 17/00* (2006.01)
 *B60W 30/18* (2012.01)
 (Continued)

(52) U.S. Cl.
 CPC .......... *B60W 30/18* (2013.01); *B60W 40/076* (2013.01); *B60W 40/13* (2013.01);
 (Continued)

(58) Field of Classification Search
 CPC ...................................................... G06F 17/00
 See application file for complete search history.

(56) References Cited

U.S. PATENT DOCUMENTS 5,832,400 A    11/1998  Takahashi et al.
6,167,357 A *  12/2000  Zhu ........................ B60T 8/172
                                              701/102
(Continued)

OTHER PUBLICATIONS

Jannson, Henrick et al., Improved Road Grade Estimation Using Sensor Fusion, Reglermöte (Conference), Mar. 2006, 6 pgs, Stockholm, Sweden.

(Continued)

*Primary Examiner* — Angela Ortiz
*Assistant Examiner* — Alex C Dunn
(74) *Attorney, Agent, or Firm* — Taft Stettinius & Hollister LLP

(57) ABSTRACT

Apparatuses, methods and systems including dynamic estimations of vehicle mass and road grade estimation are disclosed. One exemplary embodiment is a method including operating a vehicle system to propel a vehicle, determining with a controller a vehicle mass estimate and an uncertainty of the vehicle mass estimate, evaluating with the controller the uncertainty of the vehicle mass estimate relative to at least one criterion, if the uncertainty of the vehicle mass estimate satisfies the criterion, determining with the controller a road grade estimate, and controlling with the controller utilizing the road grade estimate at least one of a vehicle speed and an engine output.

23 Claims, 7 Drawing Sheets

(51) Int. Cl.
*B60W 40/13* (2012.01)
*B60W 40/076* (2012.01)
*B60W 50/00* (2006.01)

(52) U.S. Cl.
CPC .............. *B60W 2050/0022* (2013.01); *B60W 2510/0657* (2013.01); *B60W 2520/10* (2013.01); *B60W 2530/10* (2013.01); *B60W 2530/16* (2013.01); *B60W 2550/12* (2013.01); *B60W 2550/142* (2013.01)

(56) References Cited

U.S. PATENT DOCUMENTS

| | | | |
|---|---|---|---|
| 6,347,269 B1 * | 2/2002 | Hayakawa | G01M 17/007 701/51 |
| 6,438,510 B2 * | 8/2002 | Zhu | B60T 8/172 701/1 |
| 6,508,102 B1 * | 1/2003 | Margolis | B60T 8/172 73/8 |
| 6,957,139 B2 | 10/2005 | Bellinger | |
| 7,483,808 B2 | 1/2009 | Greiner et al. | |
| 7,979,185 B2 | 7/2011 | Wolfgang et al. | |
| 8,311,706 B2 * | 11/2012 | Lu | B60T 8/172 340/440 |
| 8,630,767 B2 * | 1/2014 | Karlsson | B60T 8/172 701/29.1 |
| 8,700,256 B2 * | 4/2014 | Duraiswamy | B60W 30/143 340/439 |
| 2004/0167705 A1 | 8/2004 | Lingman et al. | |
| 2010/0049400 A1 | 2/2010 | Duraiswamy et al. | |
| 2011/0066322 A1 * | 3/2011 | Karlsson | B60T 8/172 701/33.4 |
| 2011/0106388 A1 | 5/2011 | Boeckenhoff et al. | |
| 2013/0073113 A1 * | 3/2013 | Wang | B60K 6/445 701/1 |
| 2014/0067153 A1 * | 3/2014 | Yu | B60W 40/13 701/1 |
| 2014/0067154 A1 * | 3/2014 | Yu | B60W 40/076 701/1 |
| 2014/0067155 A1 * | 3/2014 | Yu | B60W 40/13 701/1 |
| 2014/0067240 A1 * | 3/2014 | Yu | B60W 40/13 701/112 |
| 2014/0172252 A1 * | 6/2014 | Siegel | F16H 61/00 701/55 |

OTHER PUBLICATIONS

Holm, Erick Jonsson, Vechicle Mass and Road Grade Estimation Using Kalman Filter, Institutionen for Systemteknik, Department of Electrical Engineering, Linkoping, Sweden, Aug. 16, 2011, 50 pages, Linkoping, Sweden.

Sahlholm, Per, et al., Road Grade Estimation for Look-Ahead Vehicle Control, The International Federation of Automatic Control, Jul. 6-11, 2008, 6 pgs. Seoul, Korea.

\* cited by examiner

VEHICLE CONTROLS INCLUDING DYNAMIC VEHICLE MASS AND ROAD GRADE ESTIMATION DURING VEHICLE OPERATION

BACKGROUND

The present application relates generally to apparatuses, methods and systems for estimating vehicle mass and/or road grade during vehicle operation and vehicle controls including the same. Vehicle mass and road grade may have a significant influence on vehicle operation and may impact fuel economy as well as perceived responsiveness to operator controls which is sometimes referred to as drivability. Estimations of these and other parameters may be utilized to improve a number of aspects of vehicle operation. Present approaches to estimation or determination of vehicle mass and/or road grade suffer from a number of shortcomings and disadvantages. There remains a significant need for the unique and inventive apparatuses, methods, systems and controls disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One exemplary embodiment is a method including operating a vehicle system to propel a vehicle, determining with a controller a vehicle mass estimate and an uncertainty of the vehicle mass estimate, evaluating with the controller the uncertainty of the vehicle mass estimate relative to at least one criterion, if the uncertainty of the vehicle mass estimate satisfies the criterion, determining with the controller a road grade estimate, and controlling with the controller utilizing the road grade estimate at least one of a vehicle speed and an engine output. Further embodiments, forms, objects, features, advantages, aspects, and benefits shall become apparent from the following description and drawings.

DETAILED DESCRIPTION OF ILLUSTRATIVE EMBODIMENTS

Figure 1:
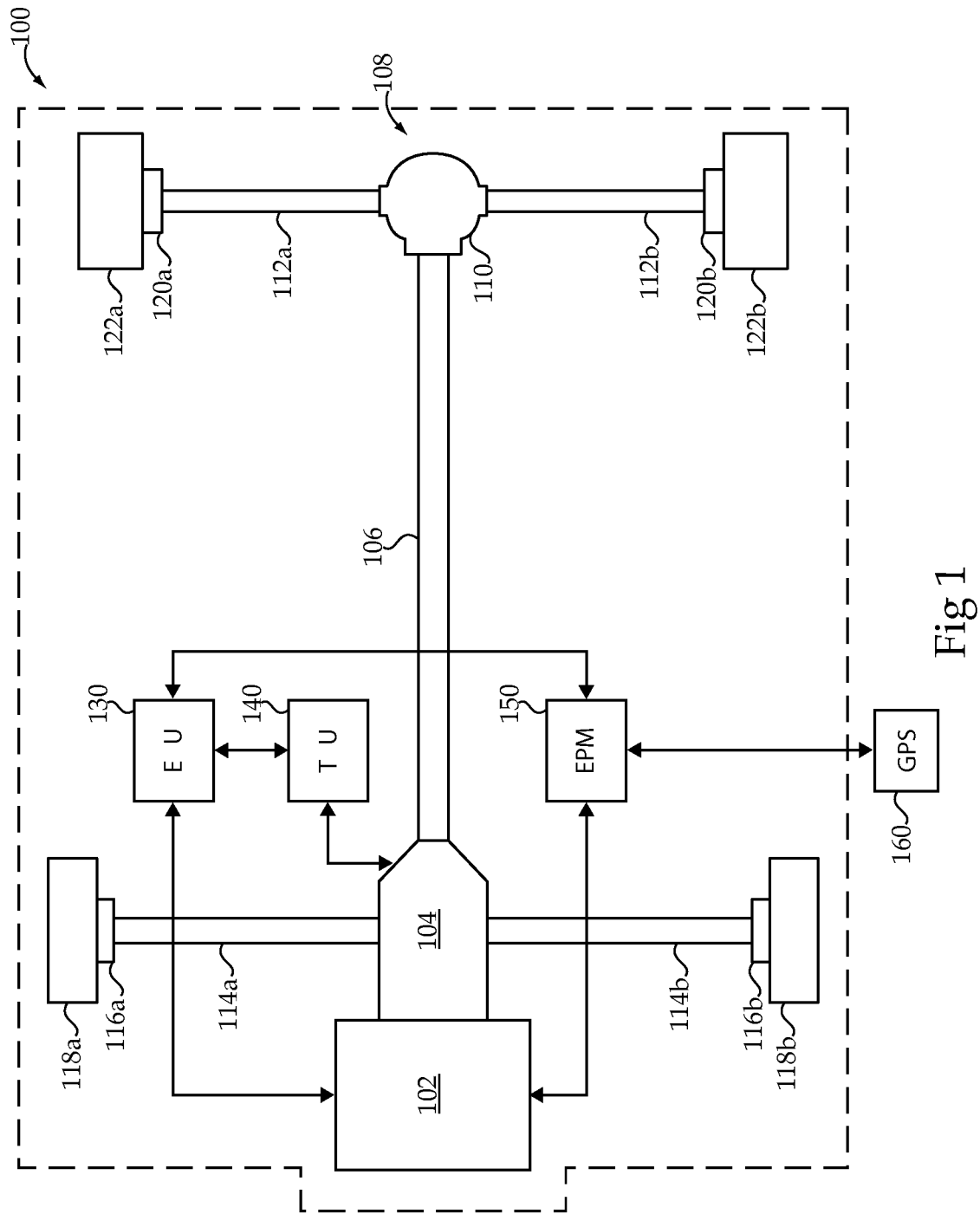
FIG. 1 is a schematic illustration of an exemplary vehicle system.

With reference to FIG. 1 there is illustrated a schematic view of an exemplary vehicle system 100 including an engine 102, such as an internal combustion engine, structured to generate power for the vehicle system 100. The vehicle system 100 further includes a transmission 104 operably connected to the engine 102 for adapting the output torque of the engine 102 and transmitting the output torque to a drive shaft 106. The vehicle system 100 illustrated in FIG. 1 includes a rear wheel drive configuration including a final drive 108 having a rear differential 110 connecting the drive shaft 106 to rear axles 112a and 112b. It is contemplated that the components of vehicle system 100 may be positioned in different locations throughout the vehicle system 100. In one non-limiting example, in a vehicle having a front wheel drive configuration, the transmission may be a transaxle and the final drive may reside at the front of the vehicle to connect front axles to the engine via the transaxle.

In the illustrated embodiment, vehicle system 100 further includes two front brakes 116a and 116b, each positioned between and operably connected to two front wheels 118a and 118b and front axles 114a and 114b, respectively. Vehicle system 100 further includes two rear brakes 120a and 120b, each positioned between two rear wheels 122a and 122b and rear axles 112a and 112b, respectively. It is contemplated that vehicle system 100 may have more or fewer tires and/or brakes than illustrated in FIG. 1. In certain embodiments, vehicle system 100 may also include various components not shown, such as a fuel system including a fuel tank, a braking system, an engine intake system, and an engine exhaust system, which may include an exhaust aftertreatment system, to name a few examples.

Vehicle system 100 includes an electronic or engine control unit (ECU) 130, sometimes referred to as an electronic or engine control module (ECM), or the like, which is directed to regulating and controlling the operation of engine 102. A transmission control unit (TCU) 140 is illustrated in vehicle system 100, which is directed to the regulation and control of transmission 104. ECU 130 and TCU 140 are each in electrical communication with one another as well as with a plurality of sensors, actuators, and additional components of vehicle system 100 via controller area network (CAN) 155. ECU 130 and TCU 140 may be structured to receive a variety of operational information relating to vehicle system 100 including, for example, engine speed, transmission speed, engine torque, engine power, gear selection, accelerator position, brake pedal position, ambient temperature, turbocharger boost pressure, intake manifold pressure, intake manifold temperature, exhaust manifold pressure, exhaust manifold temperature, local horizon prediction information, inclinometer information, and GPS or telematics information. The foregoing information may be provided by physical sensors, virtual sensors or combinations thereof.

In certain embodiments, the ECU 130 and the TCU 140 may be combined into a single control module, commonly referred to as a powertrain control module (PCM) or powertrain control unit (PCU), or the like. It is contemplated that ECU 130 may be integrated within the engine 102 and/or TCU 140 may be integrated within transmission 104. Other various electronic control units for vehicle subsystems are typically present in vehicle system 100, such as a braking system electronic control unit and a cruise control electronic control unit, for example, but such other various electronic control units for vehicle subsystems are not show in vehicle system 100 to preserve clarity.

Vehicle system 100 further includes an engine power management (EPM) controller 150 operably connected to the ECU 130 for receiving vehicle system 100 sensor data and conditions. EPM controller 150, which may be dedicated to some or all of the controls and processes disclosed in further detail below as well as to additional control for the regulation and control of the engine in vehicle system 100. In the illustrated embodiment, EPM controller 150 is in electrical communication with the ECU 130. It is contemplated that in certain embodiments EPM controller may be in electrical communication with TCU 140. In certain embodiments, at least a portion of the EPM controller 150 may be integrated within the ECU 130 and/or TCU 140. EPM controller 150 may further be in electrical communication with one or more of the plurality of vehicle sensors in vehicle system 100 for receiving and transmitting conditions of vehicle system 100, such as temperature and pressure conditions, for example.

In the exemplary embodiment illustrated in FIG. 1, a navigation and positioning system 160, such as a global position system (GPS) device mounted external to vehicle system 100 and/or an electronic horizon device connected to vehicle system 100, may be electronically connected to EPM controller 150 for the purpose of providing route grade information. In certain embodiments, additional information from the navigation and positioning system 160 may be transmitted to the EPM controller 150, such as traffic, elevation, and/or weather conditions, for example. It is contemplated that in certain embodiments, specifically where a navigation and positioning system 160 is not connected to EPM controller 150, that route grade information may be programmed into memory and accessed by the EPM controller 150 while the vehicle is travelling along the travel route.

It is contemplated that that the controls, control systems, and control devices disclosed herein may be utilized in connection with intelligent transport systems and services (ITS) which comprises systems that integrate of information and communication technologies with transport infrastructure to improve economic performance, safety, mobility and environmental sustainability. An exemplary ITS system includes three operational layers: a data collection layer, a data aggregation and translation layer and an information dissemination layer.

The data collection layer may include EPM controller 150 and system 160 as well as devices and systems on a plurality of vehicles which sense and transmit data associated a plurality of vehicles at particular geographical locations. The data collection layer may further include sensors, cameras and other data sources which are fixed relative to a roadway, or information from sensors, cameras and other data sources which are provided on surveillance vehicles such as planes and helicopters.

The data aggregation and translation layer comprises one or more computer based systems which receive and aggregate data from the data collection layer devices and process the received data to provide information about one or more roadway or traffic conditions. In certain aspect, the received data may include information about road grade, vehicle rate of speed, or change in rate of speed at particular locations which may be aggregated and processed to determine traffic speed over a given segment of roadway. In other aspects, information about weather conditions such as wind speed, precipitation and road conditions may be derived.

The information dissemination layer may include EPM controller 150 and system 160 as well as devices and systems on a plurality of vehicles which receive information transmitted from the data aggregation and translation layer. The received information may include road grade information, information about traffic speed over a given segment of roadway, as well as information about weather conditions such as wind speed, precipitation and road conditions may be derived. As further described below, ITS information from one or more of the foregoing layers may be utilized in connection with the controls, control systems, and control devices disclosed herein.

It is contemplated that at least a portion of the conditions and/or measured inputs required for interpreting signals by the EPM controller 150 may be received from ECU 130 and/or TCU 140, in addition to or alternatively to the plurality of vehicle sensors. It is further contemplated that in certain embodiments ECU 130, TCU 140, and EPM controller 150 may transmit data communication messages across a CAN 155. ECU 130 and TCU 140 comprise two components of an exemplary control system. Various other control system configurations are also contemplated.

The EPM controller 150 includes stored data values, constants, and functions, as well as operating instructions stored on computer readable medium. Any of the operations of exemplary processes described herein may be performed at least partially by the EPM controller 150. In certain embodiments, the controller includes one or more modules structured to functionally execute the operations of the controller. The description herein including modules emphasizes the structural independence of the aspects of the EPM controller 150, and illustrates one grouping of operations and responsibilities of the EPM controller 150. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2. Operations illustrated are understood to be exemplary only, and operations may be combined or divided, and added or removed, as well as re-ordered in whole or part, unless stated explicitly to the contrary herein.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
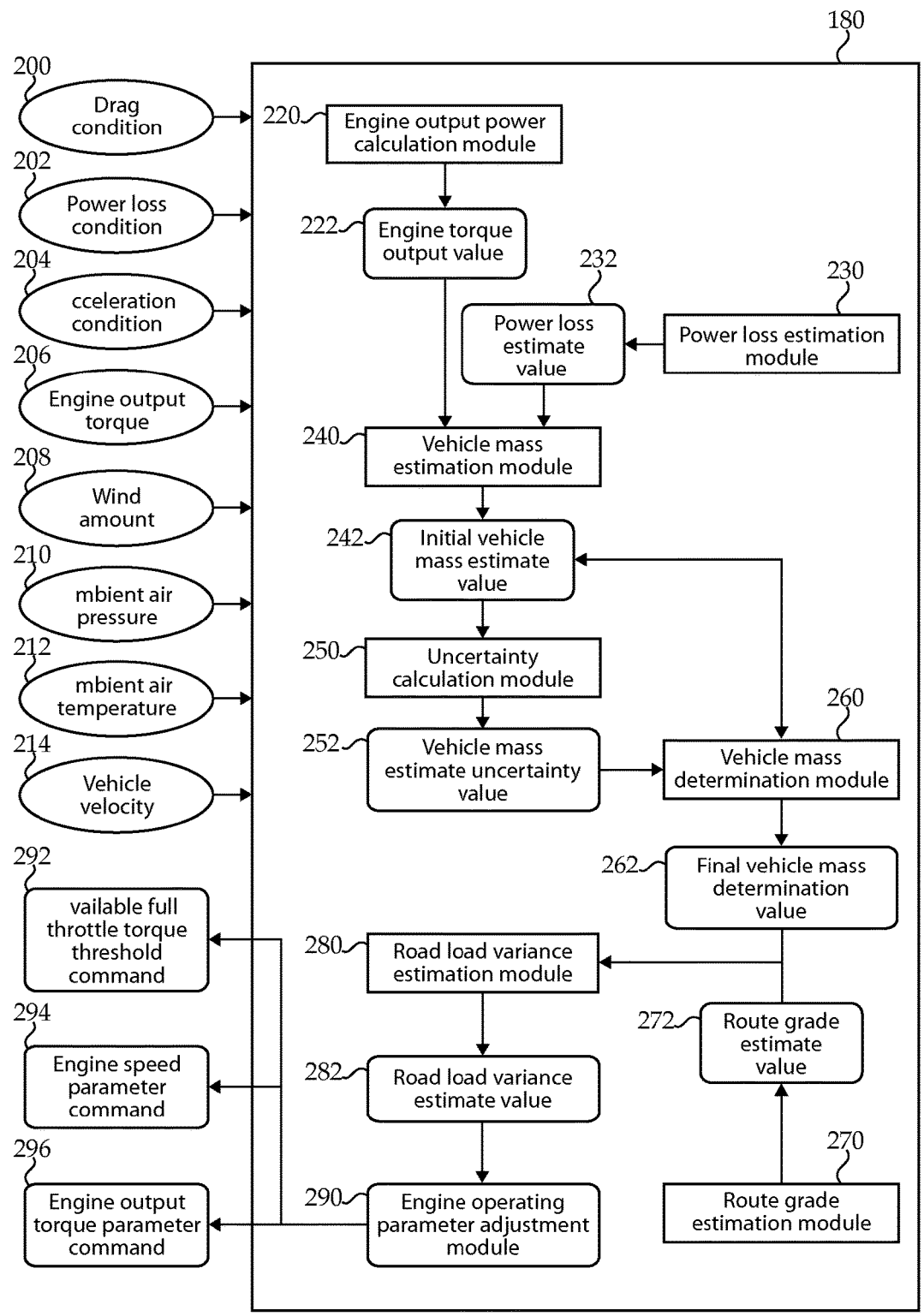
FIG. 2 is a block diagram illustrating exemplary controls for a vehicle system.

One exemplary embodiment of EPM controller 150 is shown in FIG. 2. In certain embodiments, the EPM controller 150 includes a power loss condition 202, an acceleration condition 204, an engine output torque 206, a wind amount 208, an ambient air pressure 210, an ambient air temperature 212, and a vehicle velocity 214 received from various sensors throughout vehicle system 100.

The EPM controller 150 illustrated in FIG. 2 includes an engine output power calculation module 220, a power loss estimation module 230, a vehicle mass estimation module 240, an uncertainty calculation module 250, a vehicle mass determination module 260, a route grade estimation module 270, a road load variance estimation module 280, and an engine operating parameter adjustment module 280. Other EPM controller 150 arrangements that functionally execute the operations of the EPM controller 150 are contemplated in the present application.

In operation, the power consumed by a vehicle during coasting along a travel route is compensated for by EPM controller 150 based on an engine torque physics model known to those of ordinary skill in the art. The engine torque physics model may be a function of at least one of a drag condition 200, a power loss condition 202, and an acceleration condition 204. The drag condition 200 may include a gravity drag, an aerodynamic drag, or a wheel drag. The power loss condition 202 may include a driveline power loss, a wheel power loss, a transmission power loss, and an engine power loss. The acceleration condition 204 may include a vehicle acceleration, a wheel acceleration, a final drive acceleration, a transmission acceleration, and an engine acceleration.

Engine output power calculation module 220, is configured to receive the acceleration condition 204. The engine output power calculation module 220 is directed toward determining an engine torque output value 222. The engine output power calculation module 220 inputs may further include power consumption values, such as a wheel drag power, an aerodynamic power, and a gravity power to determine an engine torque output value 222.

The power loss estimation module 230 is configured to receive the power loss condition 202. The power loss estimation module 230 is directed toward determining a power loss estimate value 232. In certain embodiments, the engine power loss may not need to be explicitly compensated for, as it may be accounted for in the engine torque output value 222. It is contemplated that in certain embodiments, specifically where a route grade is not provided by the navigation and positioning system 160 or mapped in internal memory, the engine torque output value 222 and the power loss estimate value 232 may be used in the engine torque physics model to provide a route grade estimation.

The vehicle mass estimation module 240 is configured to receive the engine torque output value 222 and the power loss estimate value 232. The vehicle mass estimation module 240 is directed toward determining an initial vehicle mass estimate value 242. In certain embodiments, the initial vehicle mass estimate value is determined in real time. An uncertainty calculation is performed on the initial vehicle mass estimate value 242 by the uncertainty calculation module 250, which is directed toward determining a vehicle mass estimate uncertainty value 252 of the initial vehicle mass estimate value 242.

In certain embodiments the vehicle mass estimate uncertainty value 252 is based on a linear quadratic estimation, commonly referred to as a Kalman filter. The linear quadratic estimation may be used to perform the uncertainty calculation and determine the vehicle mass estimate uncertainty value 252. The linear quadratic estimation is an algorithm that typically uses a series of measurements observed over time. The measurements generally contain noise (e.g., random variations) and other inaccuracies, which the linear quadratic estimation operates on recursively, producing a statistically optimal estimate of the underlying system state, or estimates of unknown variables that tend to be more precise than those based on a single measurement alone. Some examples of vehicle noise affecting a vehicle during coasting include the wind amount that may be measured by a sensor and/or weather pack, a vehicle mass that may be measured by a scale and/or calculated based on vehicle sensor inputs, an air density that may be measured by ambient air pressure and/or ambient air temperature, the route grade that may be measured by the navigation and positioning system 160, a vehicle velocity that may be measured by a vehicle speed sensor and/or calculated based on various other vehicle sensor inputs, a sampling time, and/or the engine torque physics model. It is contemplated that in certain embodiments an alternative to the linear quadratic estimation, such as a recursive total least squares (RTLS) estimator or a linear quadratic Gaussian control, may be used.

The vehicle mass determination module 260 is configured to receive the initial vehicle mass estimate value 242 and the vehicle mass estimate uncertainty value 252. The vehicle mass determination module 260 is directed toward determining a final vehicle mass estimate value 262 based on the initial vehicle mass estimate value 242 when the vehicle mass estimate uncertainty value 252 is less than an uncertainty threshold. When the vehicle mass estimate uncertainty value 252 is less than the uncertainty threshold, the vehicle mass determination module 260 outputs the final vehicle mass estimate value 262. In certain embodiments, the final vehicle mass estimate value 262 is stored in memory for the entire route or until a key off event. It is contemplated that in certain embodiments where the route grade is updated throughout the travel route that the final vehicle mass estimate value 262 may be updated during the travel route.

The route grade estimation module 270 is configured to determine a route grade estimate value 272 based on the engine torque output value 222 and the power loss estimate value 232. It is contemplated that in certain embodiments, in particular those embodiments where the route grade is transmitted to and/or stored in the EPM controller 150, the route grade estimation module 270 may not be used by EPM controller 150.

The road load variance estimation module 280 is configured to receive the final vehicle mass estimate value 262 and the route grade estimate value 272. The road load variance estimation module 280 is directed toward determining a road load variance estimate output 282 based on the engine torque physics model, the final vehicle mass estimate value 262 and the route grade estimate value 272. It is contemplated that in certain embodiments, in particular those embodiments where the route grade is transmitted to and/or stored in the EPM controller 150, the route grade estimate value 272 may not be used by the road load variance estimation module 280. The road load variance estimate output 282 may further be based on at least one of an estimated variance of the route grade, an estimated variance of the wind amount, the ambient air temperature, and the ambient air pressure.

The engine operating parameter adjustment module 290 is configured to receive the road load variance estimate value 282. The engine operating parameter adjustment module 290 is directed toward determining an available full throttle torque threshold command 292, an engine speed parameter command 294, and an engine output torque parameter command 296. The processes for determining the engine operating parameter adjustment commands 292, 294, and 296 are further detailed in FIGS. 3-4.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in combustion performance of internal combustion engines, improvements in emissions performance, aftertreatment system regeneration, engine torque generation and torque control, engine fuel economy performance, improved durability of exhaust system components for internal combustion engines, and engine noise and vibration control. Without limitation, example and non-limiting technological fields that are improved include the technological fields of internal combustion engines and related apparatuses and systems as well as vehicles including the same.

Figure 3:
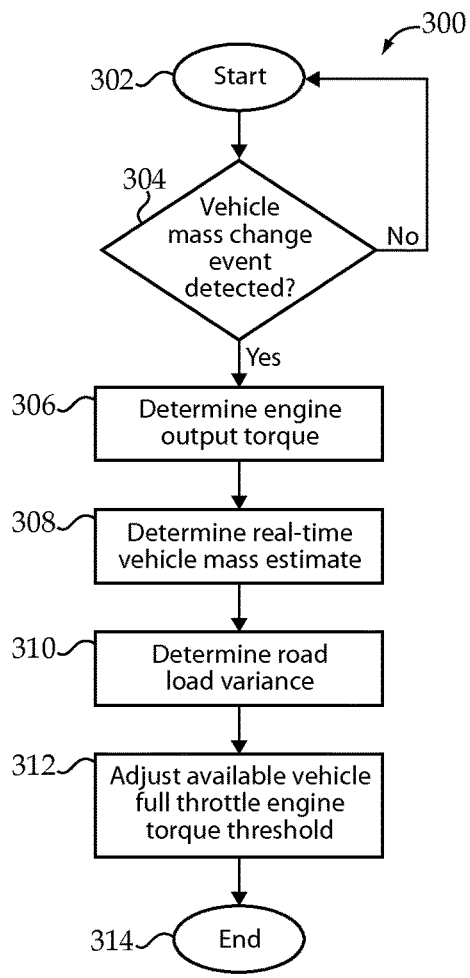
FIG. 3 is a flow diagram illustrating an exemplary control process for a vehicle system.
Figure 4:
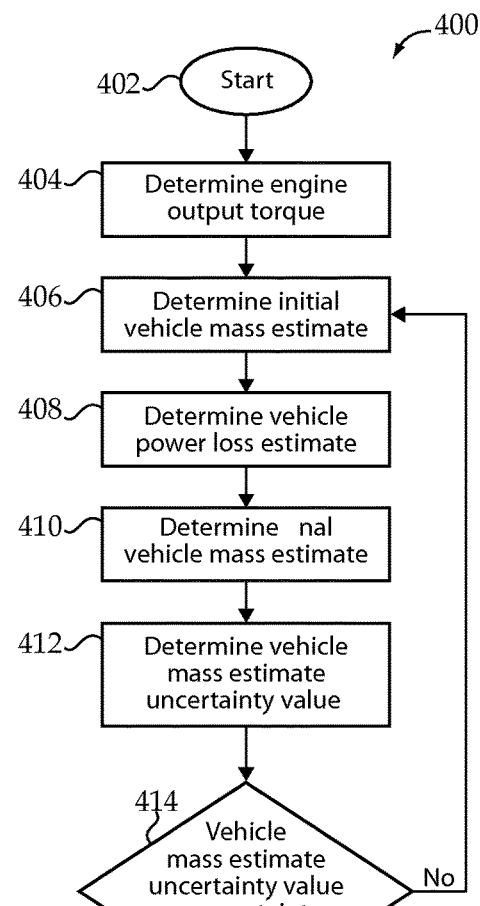
FIG. 4 is a flow diagram illustrating an exemplary process for adjusting an engine speed and/or an engine torque based on a road load variance estimate.
Figure 4:
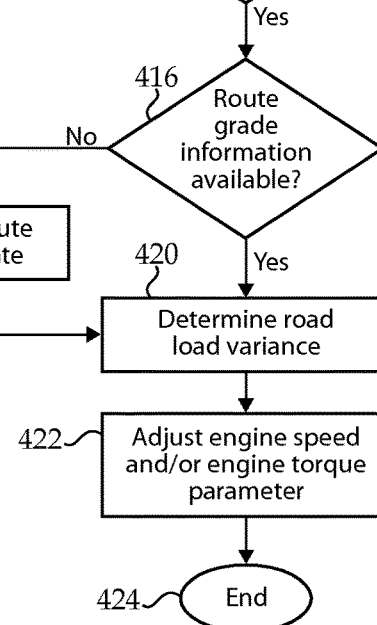

The schematic flow diagrams in FIGS. 3-4 and related description which follows provide an illustrative embodiment of performing processes for adjusting an engine torque parameter. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

With reference to FIG. 3, there is illustrated a flow diagram of an exemplary process 300 for adjusting an available full throttle engine torque. Process 300 may be put into operation by programming the EPM controller 150 for use in, for example, vehicle system 100. Process 300 begins at operation 302, in which a control routine for adjusting the available full throttle engine torque is started. Operation 302 may begin by interpreting a key on event, after a predetermined idle time, completion of a cycle, by restarting process 300, or by initiation by the operator or a technician.

Process 300 continues to conditional 304 where process 300 checks whether a vehicle mass change event is detected using a polling operation, or an active sampling of the vehicle mass status. The polling operation may be performed by actively monitoring on one or more of the vehicle sensors to detect the vehicle mass change event. When the vehicle mass change event is not detected, process 300 starts over at operation 302. When the vehicle mass change event is detected, process 300 proceeds to operation 306 to determine an engine output torque. It is contemplated that in certain embodiments, process 300 may be started by a vehicle mass change event.

From operation 306, process 300 continues to operation 308 to determine a real time vehicle mass estimate based on the engine output torque determined in operation 306. It is contemplated that the real time vehicle mass estimate may be based on one or more dynamic conditions that affect the output torque. Such dynamic conditions may include the route grade, the wind amount, the ambient air temperature, and the ambient air pressure.

At operation 310, a road load variance is determined based on the real time vehicle mass estimate determined in operation 308, the engine output torque determined in operation 306, and the one or more dynamic conditions. Process 300 continues to operation 312 where an available full throttle engine torque threshold is adjusted based on the road load variance determined in operation 310.

With reference to FIG. 4, there is illustrated a flow diagram of an exemplary process 400 for adjusting an engine speed parameter and/or an engine torque parameter. Process 400 may be put into operation by programming the EPM controller 150 for use in, for example, vehicle system 100. Process 400 begins at operation 402, in which a control routine for adjusting the engine speed parameter and/or the engine torque parameter is started. Operation 402 may begin by interpreting a key on event, after a predetermined idle time, completion of a cycle, by restarting procedure 400, or by initiation by the operator or a technician.

Procedure 400 continues from operation 402 to operation 404 to determine the engine output torque. In certain embodiments, the engine output torque may be determined using one or more of the plurality of sensors in vehicle system 100 and/or calculated using the engine torque physics model. Process 400 continues to operation 406 to determine an initial mass estimate of the vehicle. The initial mass estimation of the vehicle is based on the engine output torque determined in operation 404. From operation 406, process 400 continues to operation 408, where a vehicle power loss estimation is determined based on the driveline power loss, the wheel power loss, the engine power loss, and the transmission power loss.

Process 400 continues to operation 410 to determine a final vehicle mass estimate based on the initial vehicle mass estimate determined in operation 406, the vehicle power loss estimation determined in operation 408, and the engine torque physics model. Process 400 proceeds to operation 412 to determine the vehicle mass estimate uncertainty value. In certain embodiments, the vehicle mass estimate uncertainty value may be observed using the linear quadratic estimation, commonly referred to as a Kalman filter, or an alternative to the linear quadratic estimation, such as the RTLS estimator, for example.

From operation 412, process 400 continues to conditional 414 to determine whether the vehicle mass estimate uncertainty value is less than a predetermined uncertainty threshold to ensure a predetermined level of confidence in the vehicle mass estimate exists before proceeding. When the vehicle mass estimate uncertainty value is greater than or equal to the uncertainty threshold, process 400 returns to operation 406.

When the vehicle mass estimate uncertainty value is less than the uncertainty threshold, process 400 continues to conditional 416 to determine whether the route grade information is available for providing the route grade to EPM controller 150. In certain embodiments, the final vehicle mass estimate may be stored in memory and the same final vehicle mass estimate used for the entire route or until a key off event. It is contemplated that in certain embodiments, a route grade sensor, such as an inclinometer that may be operably connected to the transmission 104, may be used to determine route grade information. In addition to or as an alternative to the route grade sensor, the navigation and positioning system 160 and/or the route grade information programmed into the EPM controller 150 memory may be used.

When the route grade information is not available, process 400 continues to operation 418 to determine a route grade estimate based on the engine output torque determined in operation 404, the vehicle power loss estimation determined in operation 408, and the engine torque physics model. In certain embodiments, a route grade estimate uncertainty value may be observed and compared to a route grade estimate uncertainty threshold similar to the vehicle mass estimate uncertainty value and uncertainty threshold. Process 400 proceeds to operation 420 to determine the road load variance discussed in further detail below.

When the route grade information is available, process 400 continues from conditional 416 to operation 420 to determine the road load variance as a function of the engine output torque determined in operation 404 and the final vehicle mass estimate determined in operation 410. In certain embodiments, the road load variance may further be based on at least one of the route grade, the route grade estimate and/or the wind amount.

From operation 420, process 400 continues to operation 422 where the engine speed parameter and/or the engine torque parameter are adjusted based on the road load variance determined in operation 420. Process 400 is complete and ends at operation 424, where, as noted above, process 400 may be restarted.

Figure 5:
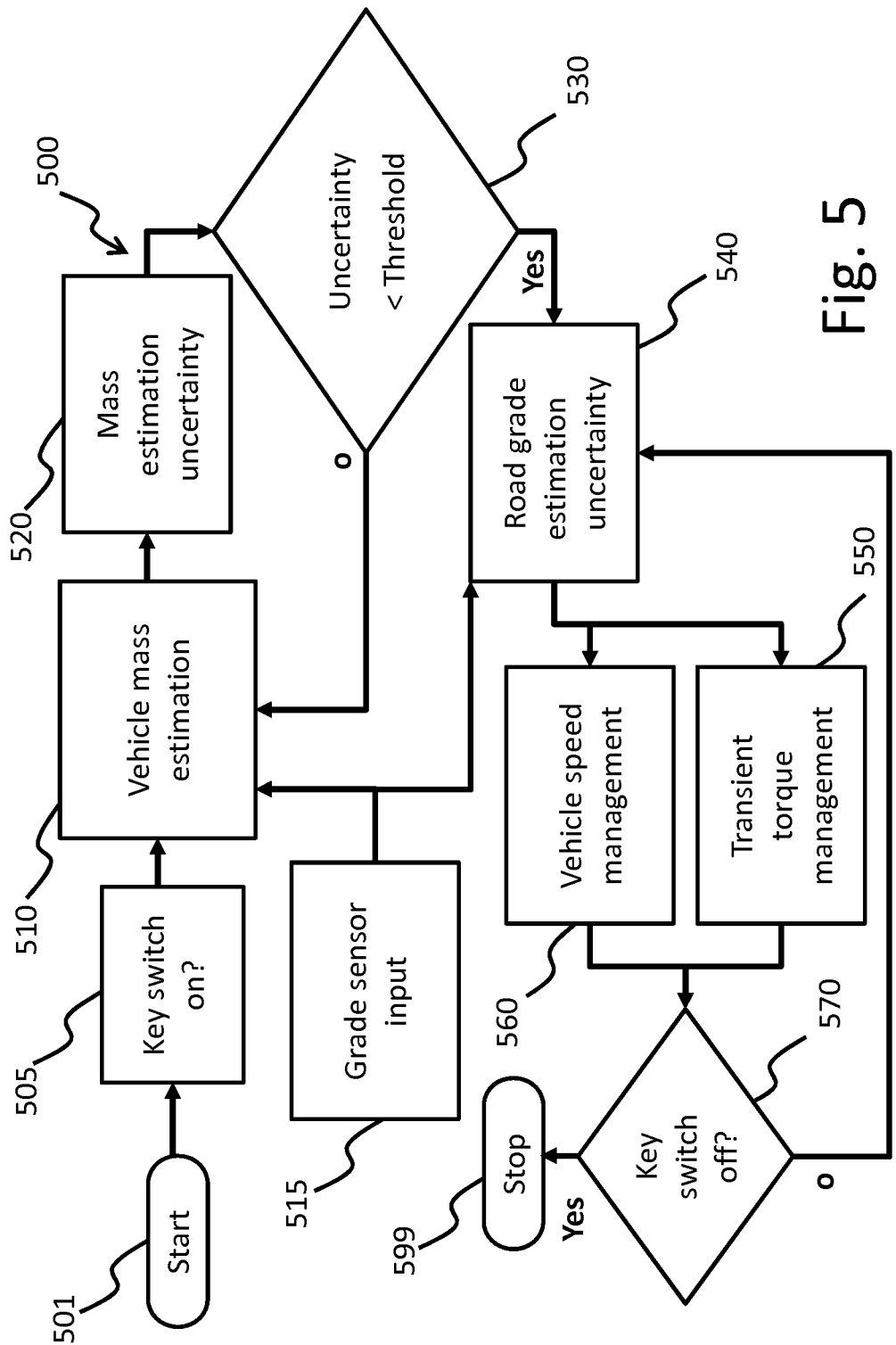
FIG. 5 is a flow diagram illustrating an exemplary control process for a vehicle system.

With reference to FIG. 5 there is illustrated a flow diagram of an exemplary process 500 which may be performed by a control system including one or more microprocessor-based controllers such as the control systems and controllers described herein. Process 500 begins as start operation 501 and proceeds to operation 505 which evaluates whether a vehicle key switch is ON. From operation 505 process 500 proceeds to operation 510 which executes a vehicle mass estimation operation. From operation 510 process 500 proceeds to operation 520 which determines an uncertainty of the vehicle mass estimation. In certain embodiments operations 510 and 520 may be implemented through a digital filter such as an extended Kalman filter, for example, as described below in connection with FIG. 7. In certain forms the digital filter may be structured to estimate a vehicle mass by recursively predicting a vehicle mass and an associated uncertainty based upon a vehicle model and correcting the prediction based upon a measurement of vehicle operation. The vehicle model may account for engine output torque or power as well as other forces acting on the vehicle such as wind resistance, rolling resistance, gravity, and other forces. In some forms the vehicle model may utilize information relating to road or terrain grade. This information may be provided by an inclinometer, or one or more other sensors which may be physical or virtual sensors. In some forms the model does not rely upon or utilize road or terrain grade information and may account for the influence of variation in these parameters, for example, by averaging over distance or time to reduce the effect of road grade at any particular point.

From operation 520, process 500 proceeds to conditional 530 which evaluates whether the uncertainty of the mass estimation meets one or more criteria, for example, whether the uncertainty is below an uncertainty threshold or satisfies another predetermined criterion such as a criteria that account for the duration or number of events that a threshold condition has been satisfied. It shall be appreciated that the threshold or other criterion may be statically predetermined or dynamically predetermined prior to the evaluation, for example, in the case of a moving threshold or other criterion. If conditional 530 evaluates NO, process 500 returns to and repeats operation 510. If conditional 530 evaluates YES, process 500 proceeds to operation 540 which performs a road grade estimation and determines an uncertainty of the road grade estimation. Operation 540 also receives information from grade sensor input 515 which is also provided to operation 510.

Grade sensor input 515 may be provided by or determined based upon a number of different sources. In certain embodiments, information from a physical sensor or a virtual sensor on board the vehicle may be utilized to provide or determine grade sensor input 515. In certain embodiments information from an ITS system external to the vehicle may be utilized to provide or determine grade sensor input 515. ITS information may be utilized as an alternative to on-board sensor information or in combination with on-board sensor information. ITS information may be utilized to improve the accuracy and/or robustness of grade sensor input 515.

In certain embodiments, ITS information may utilized in providing or determining current road grade and/or look-ahead road grade estimations. The ITS information may include, for example, data or information from other vehicles on the same route or a similar route. The ITS information may be combined with other road grade information utilizing sensor fusion techniques to provide or determine current grade information and/or predict look-ahead road grade information. Sensor fusion techniques for ITS information can also be utilized in embodiments where multiple sources of differing types provide road grade data or information (e.g., server database(s), road grade virtual sensors of multiple vehicles, physical sensors of multiple vehicles, and/or multiple vehicle databases).

In certain embodiments, ITS information may be utilized in connection with route learning techniques and systems which utilize information from multiple vehicles. For example, on repetitive routes, grade measurements from multiple external vehicles can be fused with local road grade measurements from a real or virtual sensor on a single vehicle to create a road grade route database. Grade measurements from multiple vehicles can also be fused on a central source not on a vehicle (e.g., a server) to create a road grade database. Road grade information from this database may then be utilized to provide or determine grade sensor input 515.

In certain embodiments, ITS information may be utilized in connection with vehicle mass estimation using one or more external grade sources. For example, the mass estimation techniques disclosed herein may be utilized in embodiments in which road grade information is provided by or determined based upon ITS information available through communication with other vehicles or to other source (e.g., servers).

In certain embodiments operation 540 may be implemented through a digital filter such as an extended Kalman filter, for example, as described below in connection with FIG. 7. In certain forms the digital filter may be structured to estimate a road grade by recursively predicting a vehicle mass and an associated uncertainty based upon a vehicle model and correcting the prediction based upon a measurement of vehicle operation. The vehicle model may account for vehicle mass and engine output torque or power as well as other forces acting on the vehicle such as wind resistance, rolling resistance, gravity, and other forces.

From operation 540, process 500 proceeds to operations 550 and 560. Operation 550 executes a transient torque management operation. In certain forms operation 550 dynamically adjusts a torque limit based on predetermined criteria which may include fuel economy criteria and/or drivability criteria such as perceived operator responsiveness criteria. Operation 560 performs a vehicle speed management operation. In certain forms operation 550 dynamically adjusts vehicle cruising speed, a vehicle speed limit, or a cruise control speed based on predetermined criteria which may include fuel economy criteria and perceived operator responsiveness criteria.

From operation 550 and 560 process 500 proceeds to operation 570 which evaluates whether the key switch is OFF. If conditional 570 evaluates NO, process 500 returns to operation 540 and then proceeds as described above. If conditional 570 evaluates YES, process 500 proceeds to operation 599 and stops.

It shall be appreciated that a number of additional forms of process 500 may be utilized. In certain forms operations 510 and 540 may be performed concurrently and independently (e.g., in parallel or in series but independent of one another). In such forms operations 510, 520 and 530 may repeat until the uncertainty of the mass estimate meets one or more criteria. The vehicle mass estimate may then be fixed or held constant for a period of operation. Operation 540 may repeat concurrently with and independent of operations 510, 520 and 530. Operation 540 may be disabled or suspended if a condition exists where reliable road grade estimation is not possible, for example, when the vehicle is braking or when vehicle acceleration is out of range. In one form operation 540 may be disabled or suspended when vehicle acceleration is below a minimum threshold or above a maximum threshold. The minimum and maximum thresholds may be static or may be determined dynamically.

Figure 6:
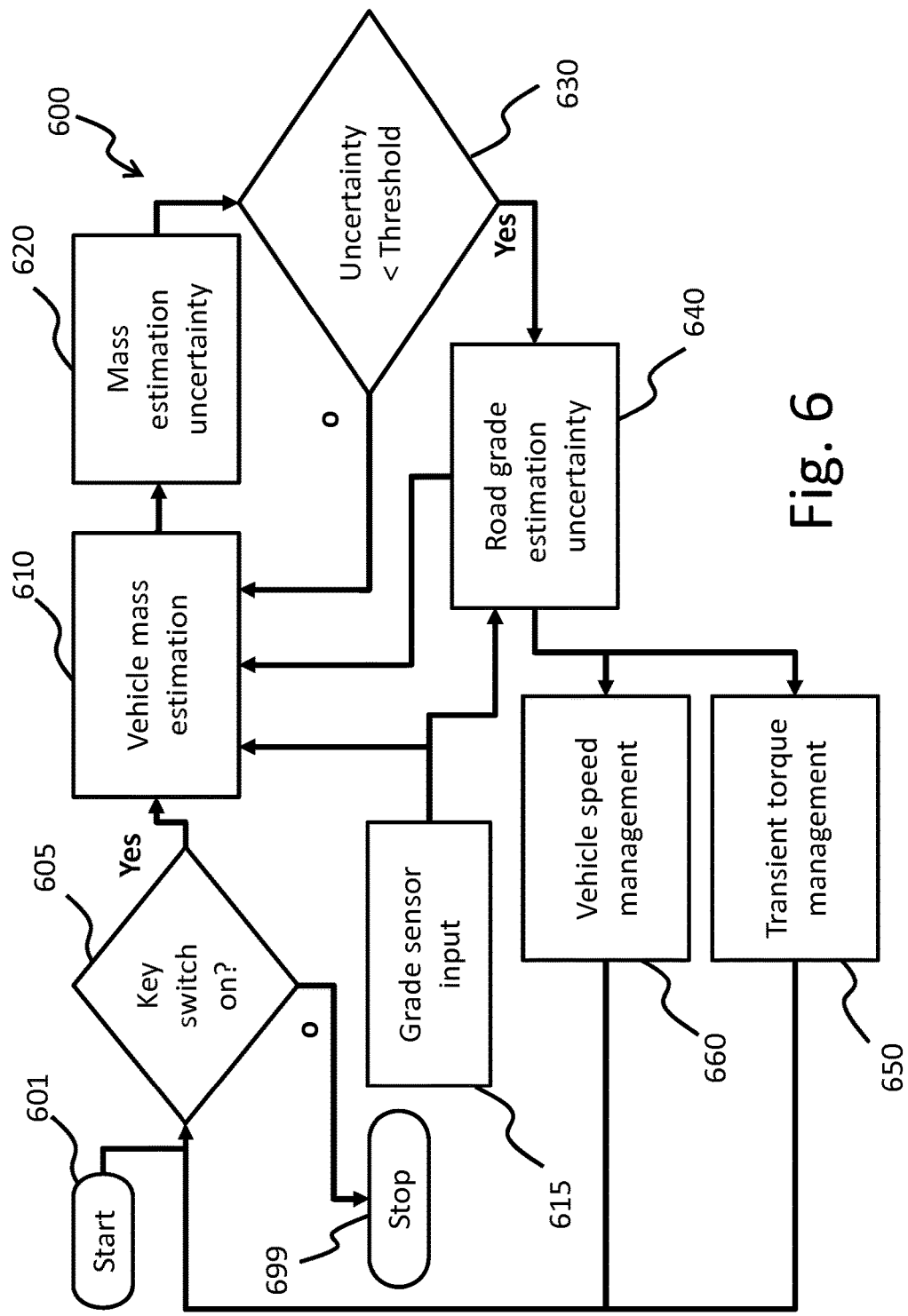
FIG. 6 is a flow diagram illustrating an exemplary control process for a vehicle system.

With reference to FIG. 6 there is illustrated a flow diagram according to an exemplary process 600. Process 600 includes a number of operations and conditionals which are the same as or substantially similar to those of process 500 described above in connection with FIG. 5 and which are labeled with reference numerals incremented by a value of one hundred. It shall be appreciated that the features of process 600 may include the attributes and functionalities described for the corresponding features of process 500. Thus, for example, start operation 601 corresponds to and is substantially similar to start operation 501.

Process 600 also differs from process 500 in certain aspects. In one such aspect the output of road grade estimate and uncertainty operation 640 is provided as an input to vehicle mass estimation operation 610. Thus, in process 600 vehicle mass estimation and road grade estimation and their corresponding uncertainties are repeatedly determined and used as inputs to one another for subsequent iterations. In contrast, system 500 may determine a mass estimation and associated uncertainty repeatedly until one or more criteria are satisfied and may then fix that estimate and use it repeatedly for some period of time or operation.

It shall be appreciated that a number of additional forms of process 600 may be utilized. In certain forms operations 610 and 640 may be performed concurrently and independently (e.g., in parallel or in series but independent of one another). In such forms operations 610, 620 and 630 may repeat until the uncertainty of the mass estimate meets one or more criteria. The vehicle mass estimate may then be fixed or held constant for a period of operation. Operation 640 may repeat concurrently with and independent of operations 610, 620 and 630. Operation 640 may be disabled or suspended if a condition exists where reliable road grade estimation is not possible, for example, when the vehicle is braking or when vehicle acceleration is out of range. In one form operation 640 may be disabled or suspended when vehicle acceleration is below a minimum threshold or above a maximum threshold. The minimum and maximum thresholds may be static or may be determined dynamically.

Figure 7:
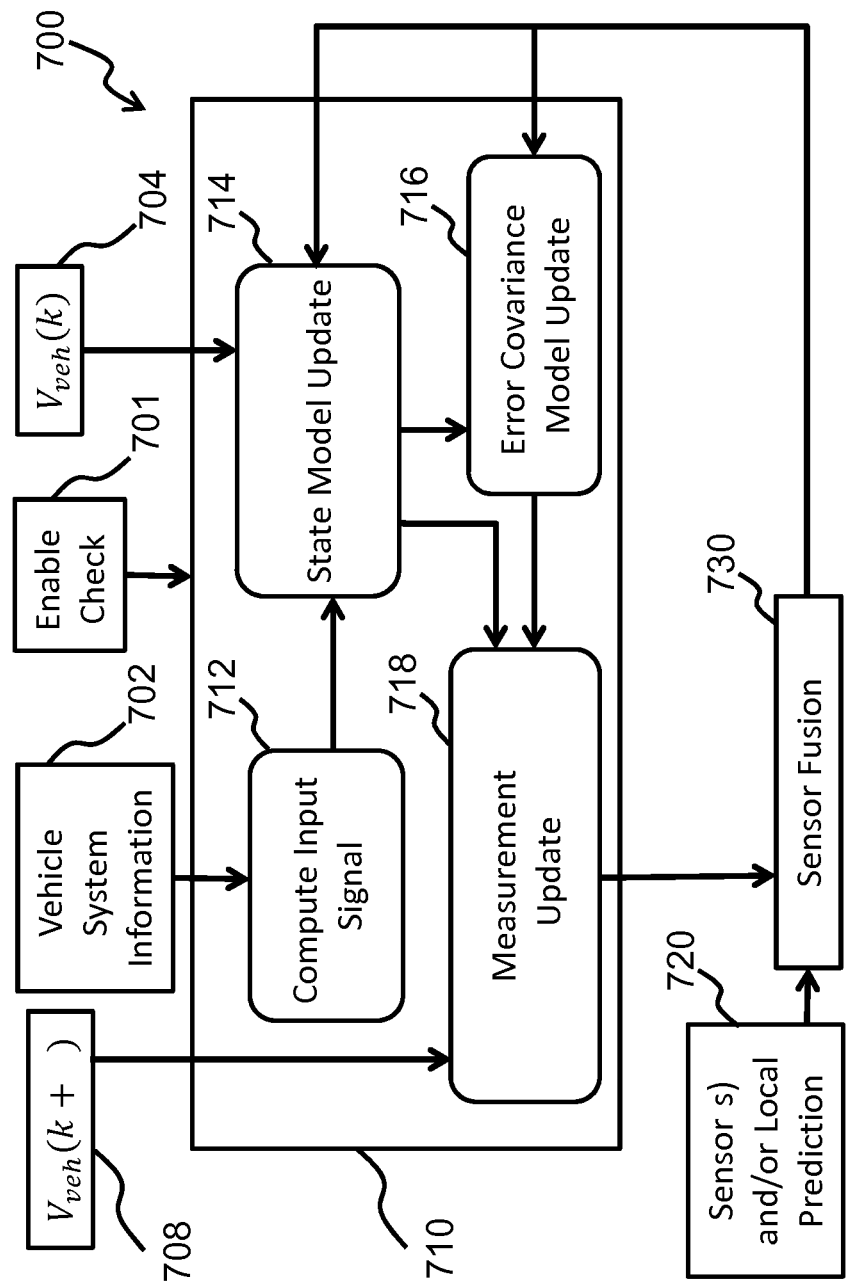
FIG. 7 is a block diagram illustrating exemplary controls for a vehicle system.

With reference to FIG. 7 there is illustrated exemplary controls 700 which may be implemented a control system including one or more microprocessor based controllers such as the control systems and controllers described herein above. Controls 700 include a digital filter 710. In the illustrated embodiment digital filter 710 is structured as an extended Kalman filter including a compute input signal module 712, a state model update module 714, an error covariance model update module 716 and a measurement update module 718. It shall be appreciated that other digital filter forms may also be utilized including, for example, a recursive least squares filter.

Digital filter 710 receives input signal from enable check module 701. When the value of the input signal is true, digital filter 710 is enabled and when the value is false, digital filter 710 is disabled. Enable check module 701 may determine the value of the input signal by evaluating a number of different variables including, for example, vehicle systems information 702 and vehicle velocity information 708 which are described in further detail below as well as brake command and other information. The enable check module 701 is preferably structured to disable digital filter 710 when vehicle operating conditions are not conducive to its operation, for example, during braking events, low velocity vehicle operation, and/or low vehicle acceleration operation. In some embodiments proxies for such conditions may be utilized, for example, the vehicle gear state being out of gear, or the current gear number meeting a gear number criterion (e.g., one or more of the higher gears of the vehicle may be used as a proxy for low vehicle acceleration operation).

Vehicle system information 702 is provided as an input to module 712. Vehicle system information 702 may include engine output torque, axle speed, and transmission speed at a given state (k). A variety of other vehicle system information may also be utilized including, for example, gear ratio information, axle ratio information, axle torque information and transmission torque information. Module 712 determines a measurement input signal based upon the information which it receives and provides the input signal to module 714. Module 712 may also remove certain undesired components or noise from the input signal, for example, using a low pass filter or a band pass filter. An initial vehicle velocity value 704 and an estimate provided as an output of sensor fusion module 730 are also provided as inputs to module 714. Module 714 is structured to determine a state prediction based upon the measurement and estimate inputs which it receives. In certain forms the state prediction may be a prediction of vehicle mass which is based upon a physical model of a vehicle and the received input information. In further forms the state model prediction may be a prediction of road grade which is based upon a physical model of a vehicle and the received input information. In forms where the state model is a prediction of road grade, ITS road grade information may be provided to sensor fusion module 730, for example, using one or more of the techniques described above.

Module 714 provides the state prediction as an input to module 718. Module 714 also determines an error or uncertainty associated with the state model prediction which is provided as an input to error covariance model update module 716. Module 716 determines an updated error covariance which it provides to module 718. A current vehicle velocity 708 is also provided as an input to module 718. Module 718 is structured to correct the state prediction based upon the inputs which it receives to determine a corrected state estimate. As noted above the corrected state estimate may be a vehicle mass estimate in certain forms and a road grade estimate in certain forms.

The inputs provided module 714 may be processed with a digital filter structured to dynamically change a first weighting factor for the prediction and a second weighting factor for the for information of actual operation. In certain forms, the digital filter is structured to dynamically change the first weighting factor and the second weighting factor based upon a schedule that decreases a relative weight of the second weighting factor to the first weighting factor as a function of the duration of operation of the filter. In certain forms, the digital filter is structured to dynamically change the first weighting factor and the second weighting factor based upon a set of criteria empirically determined to indicate the reliability of at least one of the prediction and the information of actual operation.

The corrected state prediction determined by module 718 is provided to sensor fusion module 730 which also receives inputs from one or more sensors and/or local predictions 720. It shall be appreciated that in certain embodiments ITS road grade information may be utilized as an alternative to or in combination with the inputs from inputs from one or more sensors and/or local predictions 720. Module 730 determines a fused value based upon the inputs which it receives and provides this value as an input to module 714. The output of module 730 is also provided to error covariance model update module 716. In certain embodiments, the output of module 730 may also be provided to other parts of digital filter 710, for example, to module 718 which may utilize the received output in a local prediction operation. Further exemplary details of pertaining to sensor fusion are described below in connection with FIG. 8 and it shall be appreciated that this description is also applicable to certain embodiments of module 730.

Figure 8:
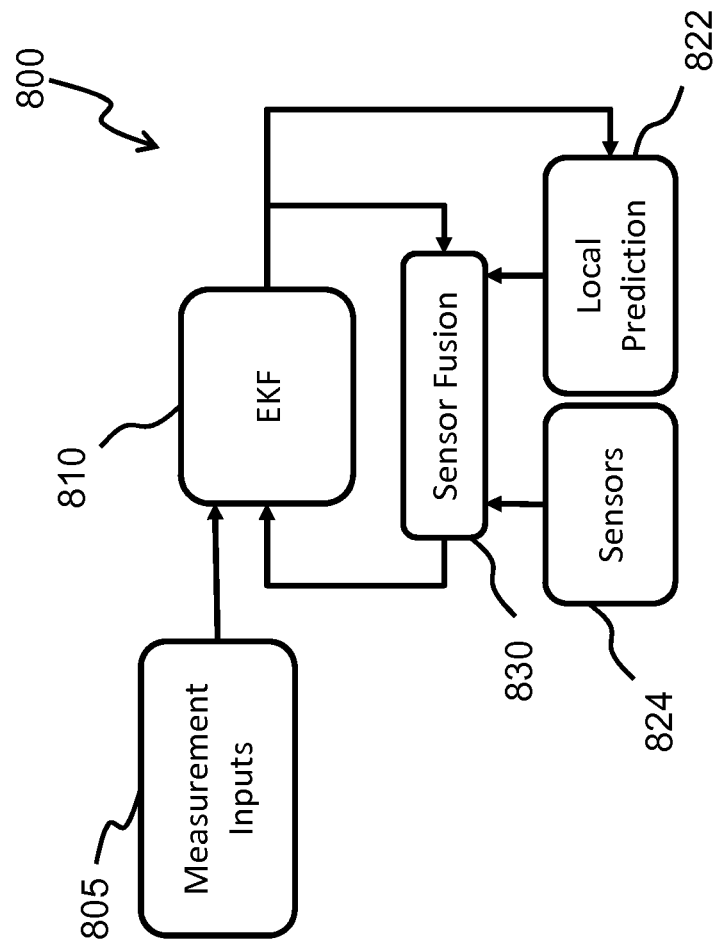
FIG. 8 is a block diagram illustrating exemplary controls for a vehicle system.

With reference to FIG. 8 there are illustrated exemplary controls 800 which may be implemented in a control system including one or more microprocessor based controllers such as the control systems and controllers described herein above. Controls 800 include a digital filter 810 which may be same as or similar to the digital filter 710 described above in connection with FIG. 7. For simplicity of illustration the various measurement inputs illustrated and described above in connection with controls 700 are not illustrated though is shall be understood that they may be present. In the illustrated embodiment digital filter 810 is structured as an extended Kalman filter although other forms of digital filters may be utilized in other embodiments.

Controls 800 further include sensor fusion module 830 which receives inputs from digital filter 810, from one or more sensors 824 and from local prediction module 822. Sensors 824 may include physical sensors or virtual sensors. It shall be appreciated that sensor fusion module 830 can be utilized to fuse any number and form of sensory information, including information from real physical sensors, simple mathematically modeled sensors (such as virtual sensors), complex estimated values (such as Kalman observers), and ITS road grade information.

Local prediction module 822 may be utilized to mitigate a number of potential issues with an extended Kalman filter implementation. When fitting multiple parameters, significant excitation in the measurement signal can result in significant changes in the estimate of multiple parameters For example, a road grade estimate may suddenly change based on the vehicle acceleration. Depending upon the parameter being estimated, sudden, significant changes in the estimate of a parameter may be unrealistic. Local prediction module 822 is structured to mitigate these issues through parametric or non-parametric fitting of the current and recent values of the estimates to some criteria or constraints associated with local conditions. The local criteria may be, for example, a limit on maximum road grade or a limit on rate of change of road grade which may be predetermined based on different criteria including road engineering specifications for a given locality, or dynamically determined based on external information received through a telemetry system. In one embodiment, the optimum curve fit form, variance, and number of values to be fitted can be determined by evaluating a family of curves, variances and number of points on a collection of routes with known parameters. The set that minimizes the error in the estimate can be employed.

It shall be appreciated that each input source to sensor fusion module 830 is subject to its own degree of uncertainty. Multiple observations or estimates of a given parameter such as road grade can be merged to provide an estimate with reduced uncertainty. In one example, two Gaussian distributions representing different estimates can be merged by combining their sample means ($\overline{X}$) and co-variance matrices (C) which correspond to their variances or standard deviations squared ($C=\sigma^2$) in accordance with the following equations:

$$C\text{merged}=C1-C1[C1+C2]^{-1}C1 \quad \text{(Equation 1)}$$

$$\overline{X}\text{merged}=\overline{X}1+C1[C1+C2]^{-1}(\overline{X}2-\overline{X}1) \quad \text{(Equation 2)}$$

It shall be appreciated that similar techniques may be utilized to fuse more than two observations or estimates. In principle any number of observations or estimates of a given parameter such as road grade can be merged to provide an estimate with reduced uncertainty.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method of controlling a vehicle system including an engine and a controller, the method comprising:
   operating the vehicle system to propel the vehicle;
   during operation of the vehicle system:
   determining with the controller a vehicle mass estimate and an uncertainty of the vehicle mass estimate,
   evaluating with the controller the uncertainty of the vehicle mass estimate relative to at least one criterion,
   if the uncertainty of the vehicle mass estimate satisfies the criterion, determining with the controller a road grade estimate by recursively predicting a road grade based upon a model of the vehicle system and the vehicle mass estimate, correcting the prediction based upon a measurement of operation of the vehicle system, and providing the corrected prediction as the road grade estimate; and controlling with the controller utilizing the road grade estimate at least one of a vehicle speed and an engine output, wherein the criterion comprises an uncertainty threshold and the acts of determining with the controller the vehicle mass estimate and the uncertainty of the vehicle mass estimate and evaluating with the controller the uncertainty of the vehicle mass estimate relative to the criterion are repeated until the uncertainty of the vehicle mass estimate is below the uncertainty threshold.

2. The method of claim 1 wherein the vehicle mass estimate is fixed for a period of operation after the uncertainty of the vehicle mass estimate is evaluated to be below the uncertainty threshold.

3. The method of claim 1 wherein the vehicle mass estimate is repeatedly determined after the uncertainty of the vehicle mass estimate is evaluated to be below the uncertainty threshold.

4. The method of claim 3 wherein the repeated determination of the vehicle mass estimate is based in part upon the road grade estimate.

5. A method of controlling a vehicle system including an engine and a controller, the method comprising:
operating the vehicle system to propel the vehicle;
during operation of the vehicle system:
determining with the controller a vehicle mass estimate and an uncertainty of the vehicle mass estimate,
evaluating with the controller the uncertainty of the vehicle mass estimate relative to at least one criterion,
if the uncertainty of the vehicle mass estimate satisfies the criterion, determining with the controller a road grade estimate by recursively predicting a road grade based upon a model of the vehicle system and the vehicle mass estimate, correcting the prediction based upon a measurement of operation of the vehicle system, and providing the corrected prediction as the road grade estimate; and
controlling with the controller utilizing the road grade estimate at least one of a vehicle speed and an engine output, wherein the corrected prediction provided as the road grade estimate is combined with at least one additional estimate and the combined estimate is provided as an input for subsequent recursive determination of the road grade estimate.

6. The method of claim 5 wherein the at least one additional estimate comprises at least one of an estimate based upon information of an sensor, an estimate based upon a local prediction which fits road grade data to a predetermined curve, and road grade information based at least in part upon information received from an ITS system.

7. The method of claim 6 wherein the sensor is an inclinometer.

8. The method of claim 5 the wherein the corrected prediction provided as the road grade estimate is combined with at an estimate based upon information of a sensor and an estimate based upon a local prediction which fits road grade data to a predetermined curve.

9. The method of claim 1 wherein the determining with the controller the road grade estimate utilizes an extended Kalman filter.

10. A system comprising:
a vehicle system including an engine structured to propel the vehicle; and
a controller structured to receive input signals from the vehicle system and provide output signals to control the vehicle system, the controller being structured to:
repeatedly determine a vehicle mass estimate and an uncertainty of the vehicle mass estimate during operation of the vehicle system,
when the uncertainty of the vehicle mass estimate is below an uncertainty threshold determine a road grade estimate by operating a digital filter to repeatedly predict a road grade using the vehicle mass estimate and a model of the vehicle system, correct the prediction using information of actual operation of the vehicle system, and set the corrected prediction as the road grade estimate, and
control at least one of a vehicle speed and an engine output using the road grade estimate, wherein the controller is structured to stop the repeated determination of the vehicle mass estimate and the uncertainty of the vehicle mass estimate once the uncertainty of the vehicle mass estimate is below the uncertainty threshold until a re-start condition is satisfied.

11. A system comprising:
a vehicle system including an engine structured to propel the vehicle; and
a controller structured to receive input signals from the vehicle system and provide output signals to control the vehicle system, the controller being structured to:
repeatedly determine a vehicle mass estimate and an uncertainty of the vehicle mass estimate during operation of the vehicle system,
when the uncertainty of the vehicle mass estimate is below an uncertainty threshold determine a road grade estimate by operating a digital filter to repeatedly predict a road grade using the vehicle mass estimate and a model of the vehicle system, correct the prediction using information of actual operation of the vehicle system, and set the corrected prediction as the road grade estimate, and
control at least one of a vehicle speed and an engine output using the road grade estimate, wherein the digital filter is structured to dynamically change a first weighting factor for the prediction and a second weighting factor for the for information of actual operation.

12. The system of claim 11 wherein the digital filter is structured to dynamically change the first weighting factor and the second weighting factor based upon a schedule that decreases a relative weight of the second weighting factor to the first weighting actor as a function of the duration of operation of the filter.

13. The system of claim 11 wherein the digital filter is structured to dynamically change the first weighting factor and the second weighting factor based upon a set of criteria empirically determined to indicate the reliability of at least one of the prediction and the information of actual operation.

14. A method comprising:
operating an electronic control system to determine a vehicle mass estimate during operation of the vehicle using a first Kalman filter;
operating the electronic control system to determine whether an error associated with the vehicle mass estimate satisfies a first criterion;
if the first criterion is satisfied, operating the electronic control system to determine a road grade estimate using a second Kalman filter, the second Kalman filter utilizing the vehicle mass estimate in determining the road grade estimate, wherein the first Kalman filter and the second Kalman filter are structured as extended Kalman filters; and operating the electronic control system to set at least one of a vehicle speed limit and an engine output limit utilizing the road grade estimate.

15. A method comprising:
operating an electronic control system to determine a vehicle mass estimate during operation of the vehicle using a first Kalman filter;
operating the electronic control system to determine whether an error associated with the vehicle mass estimate satisfies a first criterion;
if the first criterion is satisfied, operating the electronic control system to determine a road grade estimate using a second Kalman filter, the second Kalman filter utilizing the vehicle mass estimate in determining the road grade estimate; and
operating the electronic control system to set at least one of a vehicle speed limit and an engine output limit utilizing the road grade estimate, wherein the second Kalman filter dynamically varies a relative weighting of a prediction associated with road grade and a measurement input to the second Kalman filter associated with road grade.

16. The method of claim 15 wherein the second Kalman filter dynamically varies the relative weighting based upon empirically determined criteria associated with the reliability of the prediction, the measurement input, or both the prediction and the measurement input.

17. The method of claim 14 wherein the road grade estimate generated by the second Kalman filter is one of combined with and replaced by at least one additional indication of road grade to provide a combined or replaced estimate which is utilized by subsequent iterations of the road grade estimate generated by the Kalman filter, said additional indication comprising, at least one of: information of an sensor, an estimate based upon a local prediction which fits road grade data to a predetermined curve, and road grade information based at least in part upon information received from an ITS system.

18. A method of controlling a vehicle system including an engine and a controller, the method comprising:
operating the vehicle system to propel the vehicle;
determining with the controller during operation of the vehicle system a vehicle mass estimate and an uncertainty of the vehicle mass estimate, evaluating with the controller the uncertainty of the vehicle mass estimate relative to at least one criterion, and if the uncertainty of the vehicle mass estimate satisfies the criterion, setting a value of the vehicle mass estimate and interrupting the determination of the vehicle mass estimate and the uncertainty of the vehicle mass estimate;
determining with the controller during operation of the vehicle system a road grade estimate by recursively predicting a road grade based upon a model of the vehicle system, correcting the prediction based upon a measurement of operation of the vehicle system, and setting the corrected prediction as the road grade estimate; and
controlling with the controller utilizing the road grade estimate at least one of a vehicle speed and an engine output, wherein the criterion comprises an uncertainty threshold and the acts of determining with the controller the vehicle mass estimate and the uncertainty of the vehicle mass estimate and evaluating with the controller the uncertainty of the vehicle mass estimate relative to the criterion are repeated until the uncertainty of the vehicle mass estimate is below the uncertainty threshold.

19. A method of controlling a vehicle system including an engine and a controller, the method comprising:
operating the vehicle system to propel the vehicle;
determining with the controller during operation of the vehicle system a vehicle mass estimate and an uncertainty of the vehicle mass estimate, evaluating with the controller the uncertainty of the vehicle mass estimate relative to at least one criterion, and if the uncertainty of the vehicle mass estimate satisfies the criterion, setting a value of the vehicle mass estimate and interrupting the determination of the vehicle mass estimate and the uncertainty of the vehicle mass estimate;
determining with the controller during operation of the vehicle system a road grade estimate by recursively predicting a road grade based upon a model of the vehicle system, correcting the prediction based upon a measurement of operation of the vehicle system, and setting the corrected prediction as the road grade estimate; and
controlling with the controller utilizing the road grade estimate at least one of a vehicle speed and an engine output, wherein the determining with the controller during operation of the vehicle system a road grade estimate is suspended if at least one of a vehicle acceleration condition and a vehicle braking condition is satisfied.

20. The method of claim 19 wherein the vehicle acceleration condition comprises the vehicle acceleration being below a minimum threshold or above a maximum threshold.

21. The method of claim 19 wherein the vehicle braking condition comprises the vehicle brake being actuated.

22. The method of claim 18 wherein the determining with the controller during operation of the vehicle system a vehicle mass estimate and an uncertainty of the vehicle mass estimate and the determining with the controller during operation of the vehicle system a road grade estimate are performed concurrently and independently of one another.

23. The method of claim 18 wherein the act of correcting the prediction is based on at least one additional indication of road grade, said additional indication of road grade being based upon one or more of: information from a sensor, an estimate based upon a local prediction which fits road grade data to a predetermined curve, and road grade information based at least in part upon information received from an ITS system.

* * * * *